US007277898B2

(12) United States Patent
Lego et al.

(10) Patent No.: US 7,277,898 B2

(45) Date of Patent: Oct. 2, 2007

(54) CERTIFICATION OF ADDRESS RECORDS FOR USE IN ADDRESS HYGIENE

(75) Inventors: Linda J. Lego, Batavia, IL (US); Jeff Stangle, Charlotte, NC (US)

(73) Assignee: Pitney Bowes Inc., Stamford, CT (US)

( * ) Notice: Subject to any disclaimer, the term of this patent is extended or adjusted under 35 U.S.C. 154(b) by 417 days.

(21) Appl. No.: 11/020,847

(22) Filed: Dec. 23, 2004

(65) Prior Publication Data

US 2006/0155714 A1 Jul. 13, 2006

(51) Int. Cl.
*G06F 17/30* (2006.01)

(52) U.S. Cl. .................................................. 707/104.1

(58) Field of Classification Search ................ 707/100, 707/203, 104.1; 709/228

See application file for complete search history.

(56) References Cited

U.S. PATENT DOCUMENTS 5,452,203 A 9/1995 Moore
5,930,796 A * 7/1999 Pierce et al. ................ 707/100
5,974,427 A * 10/1999 Reiter ........................ 707/203
6,457,012 B1 9/2002 Jatkowski
2002/0105670 A1* 8/2002 Maruyama ................. 358/1.14
2003/0149776 A1* 8/2003 Tsunezumi .................. 709/228

OTHER PUBLICATIONS

Pitney Bowes Inc., Capture Move Updates, 2001.
Pitney Bowes Inc., Get Your Address Cleaner Than Ever, 2001.
Postal & Industry Services, Mail-Dat.
Cass Technical Guide 2004-2005, Coding Accuracy Support System, Jan. 2004.

* cited by examiner

*Primary Examiner*—Etienne Leroux
(74) *Attorney, Agent, or Firm*—Michael J. Cummings; Steven J. Shapiro; Angelo N. Chaclas

(57) ABSTRACT

An improved method for cleansing a plurality of address records in an address record file. The method checks an address record for an associated cleansing date. The method determines whether the associated cleansing date has expired. If the address record has no cleansing date, or if the cleansing date is expired, then an address cleansing routine is applied to the address record. Also, a new cleansing date is added to the address record based on a current date. If the cleansing date for the address record has not expired, then the cleansing routine is omitted, adding the record to the USPS statistics, and processing of the list continues. An address cleansing report is generated indicating a number of address records that were cleansed. In the preferred embodiment, the step of adding the new cleansing date to the address record includes a step of securing the cleansing date from unauthorized changes or tampering. The step of determining whether the associated cleansing date has expired will then also include a step to access secured cleansing dates in the address records.

8 Claims, 3 Drawing Sheets

CERTIFICATION OF ADDRESS RECORDS FOR USE IN ADDRESS HYGIENE

TECHNICAL FIELD

The present invention relates to computer methods and software for maintaining accurate address records by performing periodic address cleansing routines on the address records.

BACKGROUND OF THE INVENTION

Mail is an important means of distributing communications for many large organizations. To reduce postage costs, these large mailers seek to take advantage of postal discounts offered by the United States Postal Service (USPS). These discounts are generally offered if the mailer prepares its mail in such a way that it reduces the work and expense for the USPS to deliver the mail. For example, if a large mailer is willing to cleanse addresses, assign ZIPCODE information, and presort its mail into zip-code groupings of sufficient volume, then the mailer is entitled to certain postage discounts from the USPS.

An important way to reduce postage costs is to take steps to ensure the accuracy and quality of addresses printed on mailpieces. The USPS is sensitive to the fact that improperly addressed mailpieces can result in costly extra processing within the USPS delivery system. Accordingly, certain postal discounts are only available to mailers who can certify that the information included in the addresses is accurate, and that the format of the addresses is optimal for USPS automated processing.

In addition to increased postage expense from inaccurate addresses, misdirected or misdelivered mail can have an adverse impact on the effectiveness of the communication. For example, if the mailer is sending out billing statements, misdirected mail can result in lost revenues and customer dissatisfaction. Thus a mailer is motivated by its own business interests, as well as by potential USPS discounts, when striving to achieve accurate addresses.

For these reasons, mailers use address correction software on their mailing lists. Before granting postal discounts for address accuracy, the USPS requires that mailing lists be verified and cleansed by address correction software certified by the USPS' Coding Accuracy Support System (CASS). Finalist®, ForwardTrak™, and VeriMove™ software, available from Group1, a Pitney Bowes Company, are address list cleansing and updating products that assist mailers in satisfying CASS requirements.

Typically, the USPS requires that addresses be verified using a CASS certified address correction solution at least every six months, or 180 days. When an address list is verified in this manner, the date of the most recent verification is stored electronically and is associated with the list. By referring to the recorded date, the mailer will know when the next required list verification is required to maintain the postal discounts. Mailers frequently choose to perform verifications sooner than 180 days, in order to receive the other business benefits of an accurate address list.

SUMMARY OF THE INVENTION

The present invention seeks to improve upon existing address list cleansing software by making it more reliable, efficient and flexible. In the prior art address cleansing solutions, the verification date record was associated with the entire list. In order to update the verification date for any of the records on the list, it was required to perform address cleansing on the list, often resulting in extensive use of computer processing resources. However, at a given time when an updated verification is desired, many of the address files in the list may not be due for verification. For example, when different mailing lists are merged, or if new entries are added to a list, then there will be some addresses that have been verified more recently than others. Alternatively, newer entries may have already undergone verification, and may not require verification as soon as the other list entries.

The prior art address cleansing solutions also have a disadvantage in that by associating the verification date with the entire list, it is more difficult to integrate with other software that processes mail data at the record level. For example, known databases using the Mail.dat® standard exchange data at a record level to assist in postage calculation processes.

This application describes an improved method for cleansing a plurality of address records in an address record file. In a first step, the method checks an address record for an associated cleansing date. The method determines whether the associated cleansing date has expired. If the address record has no cleansing date, or if the cleansing date is expired, then an address cleansing routine is applied to the address record. When cleansing is complete and fully coded per CASS regulations, a new cleansing date is added to the address record based on a current date. If the cleansing date for the address record has not expired, then the cleansing routine is omitted and processing of the list continues. When no cleansing is performed, the old cleansing date remains, but the records are counted as successfully processed for the USPS 3553 statistics.

In a preferred embodiment, an address cleansing report is generated indicating a number of address records that were cleansed. The report may also indicate an oldest unexpired cleansing date among the plurality of address records. All USPS expiration dates are calculated on the oldest valid record found in the file processed. So, if you have a record that is 175 days old in validation, the expiration date will be in 5 days.

Because of the potential high value of the discounts given by the USPS, it may be important to provide a means for the USPS to independently ensure that proper verification procedures have been followed. Thus in a preferred embodiment, the step of adding the new cleansing date to the address record includes a step of securing the cleansing date from unauthorized changes or tampering. The step of determining whether the associated cleansing date has expired will then also include a step to access secured cleansing dates in the address records.

In a preferred embodiment, the step of securing the cleansing date is includes encrypting the cleansing date, and the step to access secured cleansing dates includes decrypting them. Alternatively, security can be achieved by providing a digital signature for the address record, and the step to access secured cleansing dates includes verifying the address record's digital signature. If the highest levels of security are not required, then the securing step may use known encoding and decoding techniques, not necessarily requiring as much computer processing as encryption and decryption.

In another preferred embodiment, the operator can determine how often to perform cleansing by assigning a number of days as an expiration parameter. The step of determining whether the associated cleansing date has expired will then depend on the user assigned expiration parameter. In this preferred embodiment, the expiration parameter cannot exceed the maximum USPS set number of days.

Further details of the present invention are provided in the accompanying drawings, detailed description and claims.

DETAILED DESCRIPTION

Figure 1:
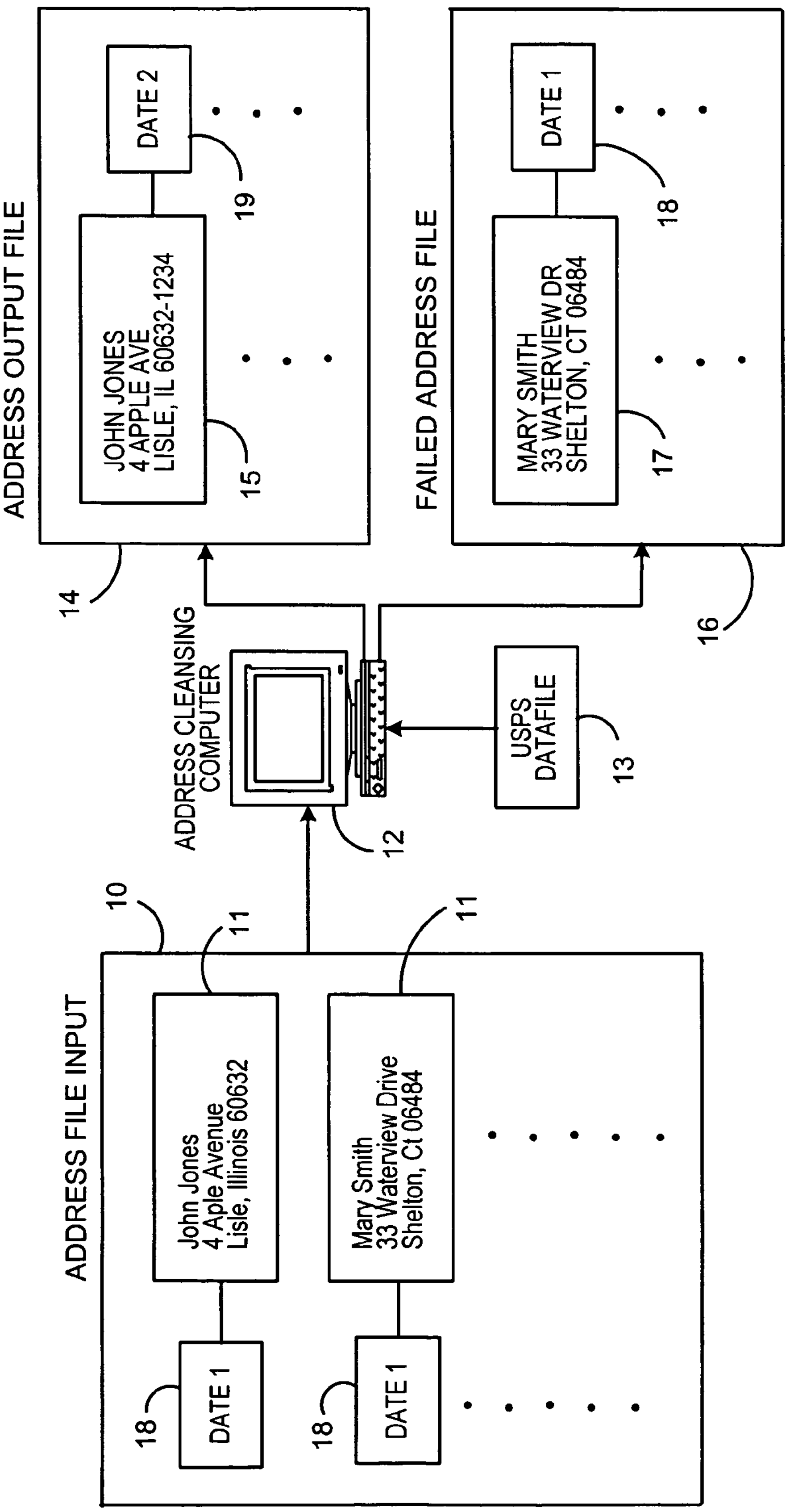
FIG. 1 depicts an address cleansing system for use with the present invention.

FIG. 1 depicts an address cleansing system that can be used with the methods of the present invention. In the preferred embodiment, an address file input 10 is provided to an address cleansing computer 12 for processing. Address cleansing computer 12 may be any conventional or commercially available desktop computer, server computer, or main frame computer that is programmed in accordance in accordance with the teachings of this application using known programming techniques. Exemplary computer systems may include those running on Windows, HP, AIX, Linux, and SUN platforms. Exemplary mainframe platforms my also include MVX, ZOS, VSE. In a preferred embodiment, the present invention is implemented as part of a stand alone computer program on a local computer 12, however a computer program including the invention described herein may also be accessed in an API environment, through another application, or over a network, such as the Internet.

Address file input 10 is comprised of address input records 11 which may or may not have an associated original date 18 associated with them. These address input records 11 may have undergone address verification at some point in the past, or they may be new records that have never been formally verified by an approved USPS address cleansing program.

When the address file input 10 is provided to the address cleansing computer 12, a USPS data file 13 is applied as part of the address cleansing routine. The USPS data file 13 includes criteria for meeting USPS standards for describing addresses. The USPS data file 13 also includes a vast list of known mailing addresses, and that list is used to determine whether the address input records 11 are valid addresses that the USPS serves.

When an address record 11 is successfully processed, it is output to an address output file 14. The address output file 14 is comprised of cleansed address records 15 with associated updated verification dates 19. The updated verification date will indicate the new date on which the successful cleansing was accomplished, and preferably replaces the older date 18, previously associated with the record 11.

In the example of FIG. 1, several different types of cleansing have been performed on the cleansed address record 15. The words have been capitalized for easier automated optical character recognition. A spelling mistake of "Apple" was corrected. Proper abbreviations for "Avenue" and "Illinois" were added. Finally, a four digit zip-code extension, delivery bar code, and other additional data was added.

Address records that fail the cleansing process in cleansing computer 12 are stored in a failed address record file 16. In the example in FIG. 1, the address could be formatted correctly, but a comparison with USPS data file 13 shows that there is no valid postal address at "33 Waterview Drive." Because record 17 was not for a valid postal address, it was transferred to the failed address file 16, and the original verification expiration date 18 is not updated.

Figure 2:
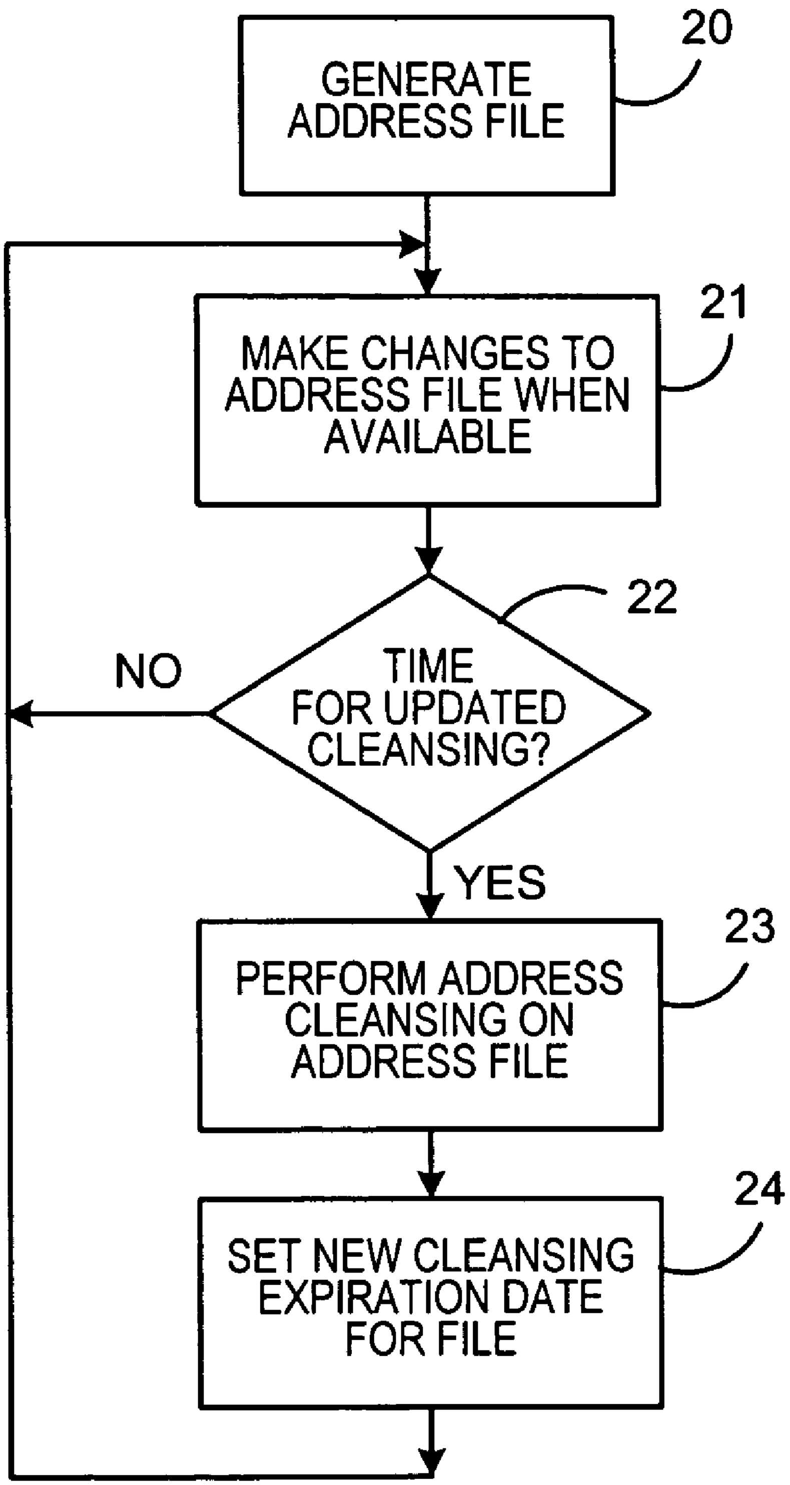
FIG. 2 is a flow diagram for a conventional address file cleansing routine.

FIG. 2 depicts a basic embodiment of a routine to be carried out on the address cleansing computer 12 for performing verification on a file of address records. In a first step 20 an address file is generated. Such an address file could be like the address file input 10 depicted in FIG. 1. The address file could be comprised of a new address file, one or more preexisting address files, or a combination of old and new address information. In a next step 21, changes are made to the address file as needed over time.

As depicted in step 22, the address cleansing computer monitors whether the verification date of the address file has expired. If the date has not expired then the method returns to steps 21 and 22 to accept more changes and to continue monitoring whether the verification date has expired. If the verification date has expired, then, at step 23, address cleansing is performed on the address file.

As noted with respect to FIG. 1, address cleansing can include spelling corrections, correcting abbreviations, adding 4 digit zip-codes, or changing the type face of the address records in the address file. Address cleansing also preferably compares address records from the file to the extensive USPS address data file 13 to determine which addresses may not be valid delivery addresses. In a further embodiment, data cleansing may include incorporating move updates for customers who have moved and changed their postal addresses. Such data is collected by the USPS and can be included in the USPS data file 13 so that mailers can update and correct their mailing lists.

After the address file has been cleansed, at step 24, the cleansing expiration date is reset, and the address cleansing computer returns to steps 21 and 22 for continued updating of the address list, and monitoring for the expiration of the verification date.

Figure 3:
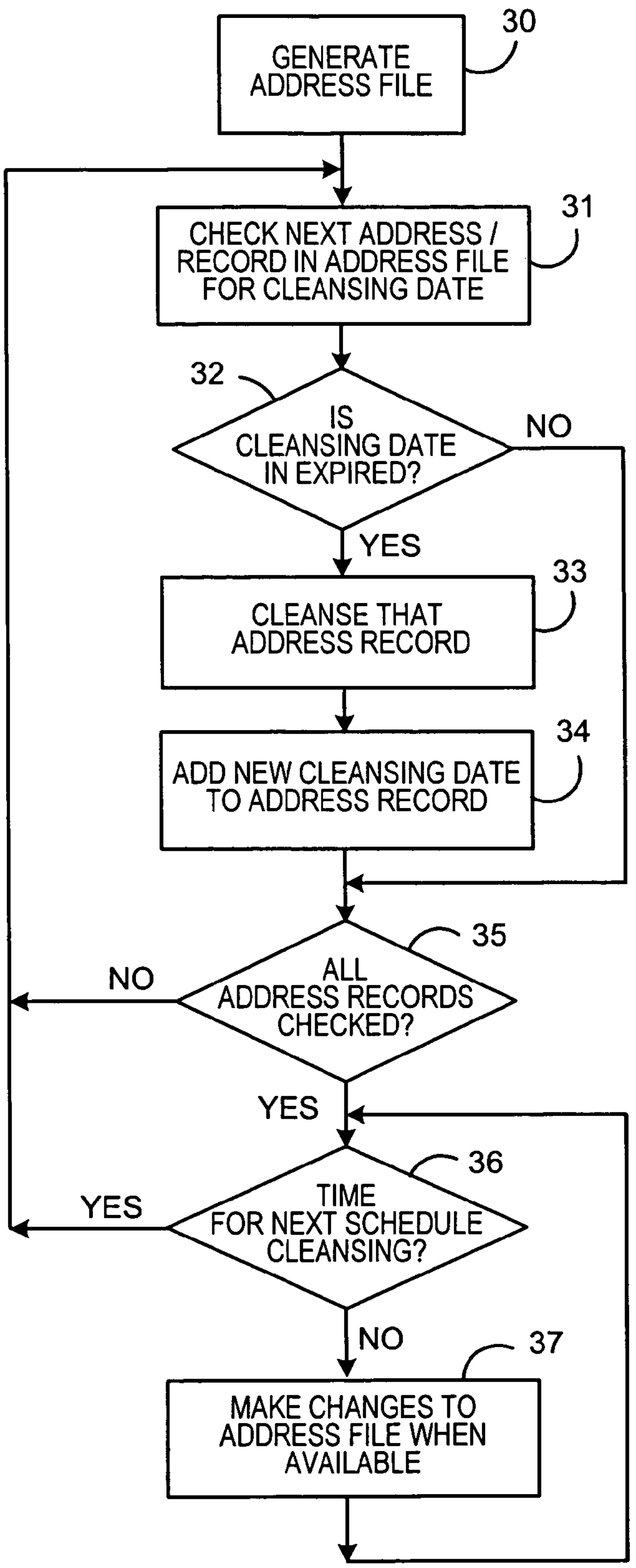
FIG. 3 is a preferred embodiment for an improved address cleansing routine.

In FIG. 3, an improved embodiment for a routine to operate the address cleansing computer 12 is depicted. At initial step 30, an address file is created. At step 31 an address cleansing routine begins by checking the cleansing date for an individual address record in the address file. At step 32, it is determined whether the cleansing date is expired for the individual record. If the cleansing date has not expired, then at step 35 it is determined whether all of the records for the file have been checked. If more records remain to be checked, then the process returns to step 31 to continue checking cleansing dates for the individual records.

If the cleansing date has expired in step 32, then a cleaning routine is performed on that specific record in step 33. The cleansing routine is only performed on records for which the cleansing date has expired. Once the record has been cleansed, a new cleansing date is added to the address record at step 34. After the address cleansing date has been updated, the method determines whether there are more records to be checked at step 35. If there are no more records to be checked, then the address cleansing for the file is complete, and the address cleansing computer 12 can monitor for the time for the next scheduled cleansing (step 36). While waiting for the next scheduled cleansing, changes to the address file can be made at step 37. When the next scheduled cleaning begins, the changes made in step 37 can then be cleansed in accordance with the steps listed above.

Alternatively, every new address record or change added to the file may cause a cleansing routine to be initiated immediately for that new record or change.

In a preferred embodiment, after completing the cleansing of all the records in an address file, the address cleansing computer 12 can generate a report giving the status of address file and tasks performed. For example, the report could describe a range of unexpired cleansing dates on the records that were processed. The report could also include a listing of the oldest unexpired cleansing date in order to assist the user in planning future processing. Preferably, the report would also include information about how many records required changes as a result of the cleansing process, and how many could not be processed and were stored in the failed address file 16.

In a further preferred embodiment, the step 34 of adding a new address cleansing date to the address record will include measures to ensure that the date is not changed without undergoing proper processing. In that situation, the USPS could be subject to costly disadvantages. If mailing lists are not maintained properly, the mailer might be taking discounts to which they are not entitled to, and the USPS might not be receiving the work saving benefits from better address hygiene. Accordingly, security measures are appropriate for ensuring that the address records and corresponding cleansing verification dates are not altered, except in accordance with software and procedures approved by the USPS.

One preferred security method is to have the address cleansing computer encrypt the cleansing date associated with the address record. Using known and commercially available encryption techniques, an encryption key would be used to encrypt the cleansing date. A corresponding decryption key would be used by the address cleansing computer 12 when checking for cleansing expiration dates associated with the records. If the date had been improperly altered, then the decryption key would not be able to decrypt meaningful information, it would be known that there was a problem so that appropriate corrective action could be taken.

A preferred encryption technique would utilize known digital signature capabilities to sign the address record. If the address record was altered in any way, the signature would cease to match the information contained in the record, and improper alteration would be detected.

In some scenarios, security concerns may not be great enough to require relatively sophisticated encryption techniques. However, a different level of security could be achieved by programming the software cleansing software to encode the cleansing date information in a way that would make it less vulnerable to unauthorized changes. For example, letters could be substituted for months and days and years to create a barrier to prevent casual or inadvertent changes from being made.

In the preferred embodiment, USPS requirements determine the maximum amount of time that is allowed between subsequent verifications of address records. A user can also control the address cleansing computer 12 to automatically perform the cleansing and verification process on any schedule less than the maximum 180 days. For example, a user may decide that each address record should be verified at least every 60 days. Because the preferred embodiment only performs cleansing on records having dates within the criteria defined by the user, a user does not have to worry as much about using excessive processing power for cleansing the entire list.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A method for cleansing addresses to comply with postal requirements, the method comprising the steps of:

storing an address list comprising a plurality of address records periodically performing address cleansing on the address list to verify whether the plurality of address records satisfy postal requirements;

wherein the step of periodically performing address cleansing on the address list further comprises performing the following steps (a)-() for each address record:

(a) checking the address record for an associated cleansing date;

(b) determining whether the associated cleansing date has expired;

(c) if the address record has no cleansing date or if the cleansing date is expired then performing the steps of:

(i) applying an address cleansing routine to the address record; and (ii) adding a new cleansing date to the address record based on a current date;

(d) if the cleansing date for the address record has not expired, then omitting step (c).

2. The method of address cleansing of claim 1 further including a step of generating an address cleansing report indicating a number of address records that were cleansed, and indicating an oldest unexpired cleansing date among the plurality of address records.

3. The method of address cleansing of claim 1 wherein the step of adding the new cleansing date to the address record includes a step of securing the cleansing date from unauthorized tampering, and the step of determining whether the associated cleansing date has expired is includes a step to access secured cleansing dates in the address records.

4. The method of address cleansing of claim 3 wherein the step of securing the cleansing date is comprised of encrypting the cleansing date, and the step to access secured cleansing dates is decrypting them.

5. The method of address cleansing of claim 3 wherein the step of securing the cleansing date is comprised of providing a digital signature for the address record, and the step to access secured cleansing dates is comprised of verifying the address record's digital signature.

6. The method of address cleansing of claim 3 wherein the step of securing the cleansing date is comprised of securely encoding the cleansing date, and the step to access secured cleansing dates is comprised of decoding the encoded cleansing date.

7. The method of address cleansing of claim 1 further including the step of assigning a number of days as an expiration parameter and wherein the step of determining whether the associated cleansing date has expired depends on the assigned expiration parameter.

8. The method of address cleansing of claim 1 wherein step (d) further includes a step of updating statistical records regarding address cleansing statistics.

* * * * *

UNITED STATES PATENT AND TRADEMARK OFFICE

CERTIFICATE OF CORRECTION

PATENT NO. : 7,277,898 B2
APPLICATION NO. : 11/020847
DATED : October 2, 2007
INVENTOR(S) : Linda J. Lego et al.

It is certified that error appears in the above-identified patent and that said Letters Patent is hereby corrected as shown below:

*Please correct claim 1. by deleting "(a) -()" as follows:*

1. A method for cleansing addresses to comply with postal requirements, the method comprising the steps of:

storing an address list comprising a plurality of address records periodically performing address cleansing on the address list to verify whether the plurality of address records satisfy postal requirements;

wherein the step of periodically performing address cleansing on the address list further comprises performing the following steps ~~(a) -()~~ for each address record:

(a) checking the address record for an associated cleansing date;

(b) determining whether the associated cleansing date has expired;

(c) if the address record has no cleansing date or if the cleansing date is expired then performing the steps of:

(i) applying an address cleansing routine to the address record; and (ii) adding a new cleansing date to the address record based on a current date;

UNITED STATES PATENT AND TRADEMARK OFFICE

CERTIFICATE OF CORRECTION

PATENT NO. : 7,277,898 B2 
APPLICATION NO. : 11/020847
DATED : October 2, 2007
INVENTOR(S) : Linda J. Lego et al.

It is certified that error appears in the above-identified patent and that said Letters Patent is hereby corrected as shown below:

(d) if the cleansing date for the address record has not expired, then omitting step (c).

Signed and Sealed this

Nineteenth Day of August, 2008

JON W. DUDAS
*Director of the United States Patent and Trademark Office*

UNITED STATES PATENT AND TRADEMARK OFFICE

CERTIFICATE OF CORRECTION

PATENT NO. : 7,277,898 B2

APPLICATION NO. : 11/020847

DATED : October 2, 2007

INVENTOR(S) : Linda J. Lego et al.

It is certified that error appears in the above-identified patent and that said Letters Patent is hereby corrected as shown below:

*Please correct claim 1. by deleting "(a) -()" as follows:*

Column 6, Claim 1, lines 9-30 should read

1. A method for cleansing addresses to comply with postal requirements, the method comprising the steps of:

storing an address list comprising a plurality of address records periodically performing address cleansing on the address list to verify whether the plurality of address records satisfy postal requirements;

wherein the step of periodically performing address cleansing on the address list further comprises performing the following steps ~~(a) – ()~~ for each address record:

(a) checking the address record for an associated cleansing date;

(b) determining whether the associated cleansing date has expired;

(c) if the address record has no cleansing date or if the cleansing date is expired then performing the steps of:

(i) applying an address cleansing routine to the address record; and (ii) adding a new cleansing date to the address record based on a current date;

UNITED STATES PATENT AND TRADEMARK OFFICE

CERTIFICATE OF CORRECTION

| | | |
|---|---|---|
| PATENT NO. | : 7,277,898 B2 | Page 2 of 2 |
| APPLICATION NO. | : 11/020847 | |
| DATED | : October 2, 2007 | |
| INVENTOR(S) | : Linda J. Lego et al. | |

It is certified that error appears in the above-identified patent and that said Letters Patent is hereby corrected as shown below:

(d) if the cleansing date for the address record has not expired, then omitting step (c).

This certificate supersedes the Certificate of Correction issued August 19, 2008.

Signed and Sealed this

Twenty-third Day of September, 2008

JON W. DUDAS

*Director of the United States Patent and Trademark Office*